US007044184B2

(12) United States Patent
Totani

(10) Patent No.: US 7,044,184 B2
(45) Date of Patent: May 16, 2006

(54) PLASTIC BAG MAKING APPARATUS

(75) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 174 days.

(21) Appl. No.: 10/704,600

(22) Filed: Nov. 12, 2003

(65) Prior Publication Data

US 2004/0112546 A1 Jun. 17, 2004

(30) Foreign Application Priority Data

Dec. 11, 2002 (JP) ............................ 2002-328065

(51) Int. Cl.

| | |
|---|---|
| ***B32B 38/04*** | (2006.01) |
| ***B32B 38/10*** | (2006.01) |
| ***B31B 19/14*** | (2006.01) |
| ***B31B 19/64*** | (2006.01) |
| ***B31B 19/74*** | (2006.01) |

(52) U.S. Cl. ...................... 156/378; 156/510; 156/516; 156/553; 493/12; 493/16; 493/342

(58) Field of Classification Search ................ 156/267, 156/516; 493/12, 16, 342, 373
See application file for complete search history.

(56) References Cited

U.S. PATENT DOCUMENTS

| | | | | |
|---|---|---|---|---|
| 3,748,205 | A * | 7/1973 | Adams | 156/252 |
| 4,033,240 | A * | 7/1977 | Deslauriers | 493/373 |
| 4,306,928 | A | 12/1981 | Okui | 156/267 |
| 4,582,506 | A * | 4/1986 | Milsmann et al. | 493/12 |
| 6,467,382 | B1 * | 10/2002 | Willits et al. | 83/27 |
| 6,648,808 | B1 * | 11/2003 | Totani | 493/342 |
| 2001/0053737 | A1 | 12/2001 | Totani | 493/287 |
| 2002/0108709 | A1 * | 8/2002 | Fukada | 156/344 |
| 2003/0073557 | A1 * | 4/2003 | Totani | 493/199 |

FOREIGN PATENT DOCUMENTS

| | | | |
|---|---|---|---|
| EP | 0 468 932 | * | 2/1991 |
| EP | 1 166 978 | A2 | 1/2002 |
| EP | 1 666 978 | A3 | 1/2004 |

* cited by examiner

*Primary Examiner*—Melvin Mayes
(74) *Attorney, Agent, or Firm*—Westerman, Hattori, Daniels & Adrian, LLP

(57) ABSTRACT

An apparatus is arranged to successively make plastic bags each of which has a shape of circumference. The apparatus comprises web feeding means by which a web material is intermittently fed for a length along a longitudinal feeding path. The web material comprises two or more layers of plastic film. Web cutting means is disposed along the feeding path. The web cutting means has a shape corresponding completely or incompletely to the shape of circumference of plastic bag so that the web material can be cut into the shape of circumference of plastic bag by the web cutting means whenever the web material is intermittently fed and temporarily stopped, to successively make the plastic bags with a waste kept continuous. The web cutting means comprises partially cutting means. The plastic bag has an upstream edge along which the web material is partially cut by the partially cutting means so that the plastic bag can be kept connected with the waste at the upstream edge of plastic bag. Drawing means is disposed downstream of the cutting means. The waste is diverged from the plastic bag, directed to and drawn by the drawing means after the web material is cut. Discharge means is disposed downstream of the cutting means. The plastic bag is directed to the discharge means without the waste. The plastic bag is then pulled by the discharge means to be torn from the waste at the upstream edge of plastic bag. The plastic bag is then discharged by the discharge means.

7 Claims, 3 Drawing Sheets

PLASTIC BAG MAKING APPARATUS

FIELD OF THE INVENTION

The invention relates to an apparatus for successively making plastic bags each of which has a shape of circumference.

PRIOR ART

There has been commercially available an apparatus for successively making plastic bags each of which has a shape of circumference, as disclosed in US-2001-0053737. The apparatus includes web feeding means by which a web material is intermittently fed for a length along a longitudinal feeding path. The web material comprises two or more layers of plastic film. The apparatus further includes web cutting means disposed along the feeding path. In the apparatus of the publication, the web material is cut partially or totally by the web cutting means whenever the web material is intermittently fed and temporarily stopped, to successively make plastic bags with wastes taken to pieces.

The apparatus is therefore problematic with respect to the wastes. In the apparatus of the publication, the wastes are pulled by waste removing means and torn from the web material to be removed. However, it is then required to suitably collect and treat the wastes. In addition, the wastes may be too small to be pulled and torn by the waste removing means. The wastes may be particular in shape which cannot be pulled and torn by the waste removing means.

It is therefore an object of the invention to provide a new and improved apparatus for successively making plastic bags each of which has a shape of circumference, to overcome the above problems.

Other object of the invention is to provide the apparatus which can successively make the plastic bags with a waste kept continuous to conveniently treat the waste.

SUMMARY OF THE INVENTION

According to the invention, the apparatus comprises web feeding means by which a web material is intermittently fed for a length along a longitudinal feeding path. The web material comprises two or more layers of plastic film.

The apparatus further comprises web cutting means disposed along the feeding path. The web cutting means has a shape corresponding completely or incompletely to the shape of circumference of plastic bag so that the web material can be cut into the shape of circumference of plastic bag by the web cutting means whenever the web material is intermittently fed and temporarily stopped, to successively make plastic bags with a waste kept continuous.

The web cutting means comprises partially cutting means. The plastic bag has an upstream edge along which the web material is cut partially by the partially cutting means so that the plastic bag can be kept connected with the waste at the upstream edge of plastic bag.

The apparatus further comprises drawing means disposed downstream of the cutting means. The waste is diverged from the plastic bag, directed to and drawn by the drawing means after the web material is cut.

The apparatus further comprises discharge means disposed downstream of the cutting means. The plastic bag is directed to the discharge means without the waste. The plastic bag is then pulled by the discharge means to be torn from the waste at the upstream of plastic bag. The plastic bag is then discharged by the discharge means.

In a preferred embodiment, the web cutting means further comprises totally cutting means. The plastic bag has other edges along which the web material is cut totally by the totally cutting means so that the plastic bag can be disconnected from the waste at other edges.

The apparatus further comprises heat seal means disposed upstream of the cutting means. The web material is heat sealed longitudinally and widthwise thereof by the heat seal means whenever the web material is intermittently fed and temporarily stopped so that heat sealed portions can be formed longitudinally and widthwise of the web material. The web material is then cut along the heat sealed portions by the web cutting means.

The web cutting means comprises THOMSON blade means opposed to the web material. The apparatus further comprises drive means by which the THOMSON blade means is moved toward and pressed against the web material whenever the web material is intermittently fed and temporarily stopped.

The partially cutting means has micro depressions formed and spaced from each other along the cutting edges thereof to leave micro joints formed and spaced from each other along the upstream edge of plastic bag. The micro joints make the web material cut partially. The plastic bag is kept connected with the waste by the micro joints.

The drawing means comprises take up means by which the waste is drawn and taken up.

The apparatus further comprises waste guide means disposed between the web cutting means and the discharge means. The waste is engaged with and guided by the waste guide means to be changed in direction, diverged from the plastic bag and directed to the drawing means so that the plastic bag can be directed to the discharge means without the waste.

The apparatus further comprises detector means for detecting the plastic bag to determine whether the plastic bag is inclined or not when the waste is diverged from the plastic bag and the plastic bag is directed to the discharge means.

The apparatus further comprises rejected bag removing means incorporated into the discharge means. The plastic bag is removed by the removing means in response to a detecting signal fed from the detector means when the plastic bag is inclined.

DETAILED DESCRIPTION OF THE PREFERRED EMBODIMENT

Figure 1:
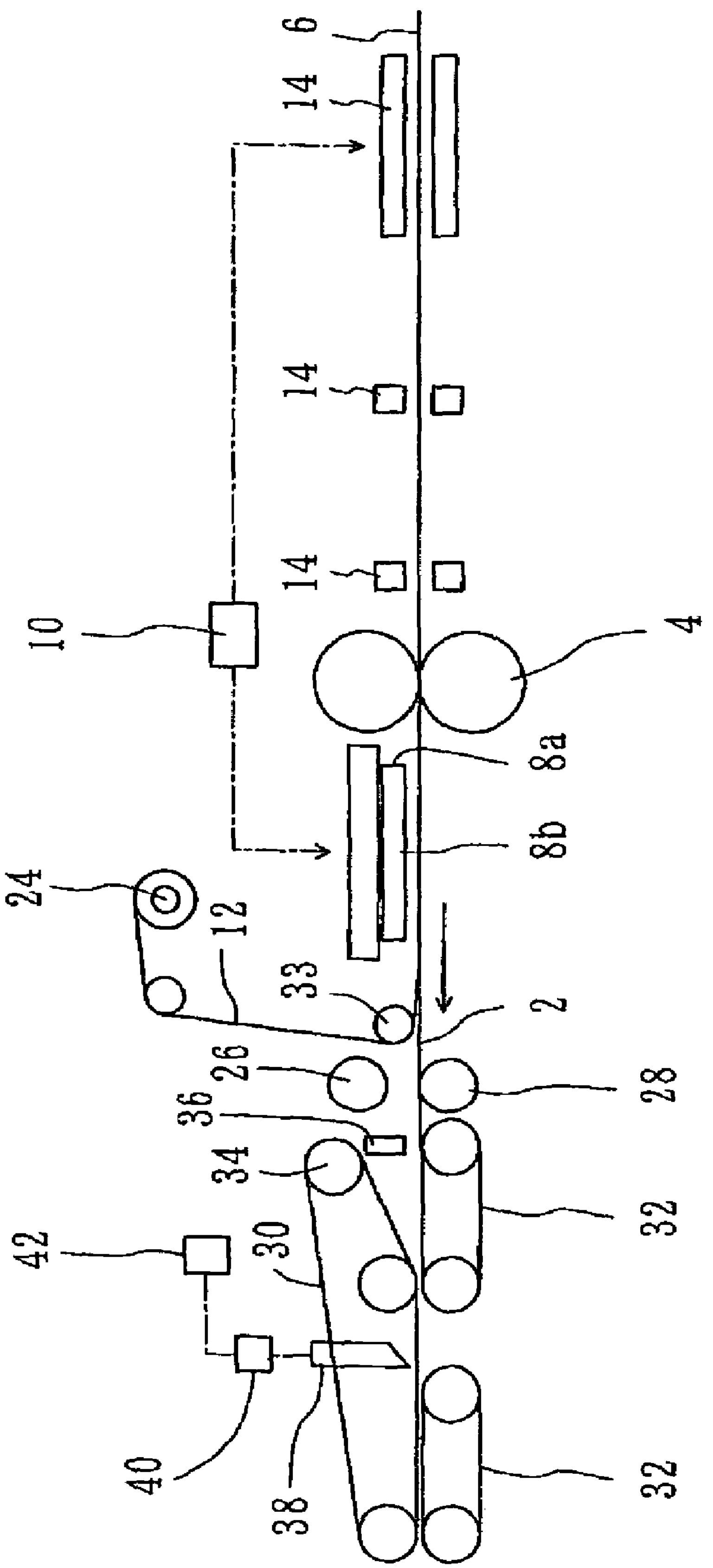
FIG. 1 is a side view of a preferred embodiment of the invention.

Referring now to the drawings, FIG. 1 illustrates an apparatus for successively making plastic bags 2 each of which has a shape of circumference, according to the invention. The apparatus includes web feeding means 4 by which a web material 6 is intermittently fed for a length along a longitudinal feeding path. In the embodiment, the web feeding means 4 comprises a pair of feeding rollers between which the web material 6 is sandwiched. The feeding rollers 4 are driven for rotation by drive means such as a motor so that the web material 6 can be intermittently fed for the length along the feeding path which extends horizontally. The web material 6 comprises two or more layers of plastic film.

Figure 2:
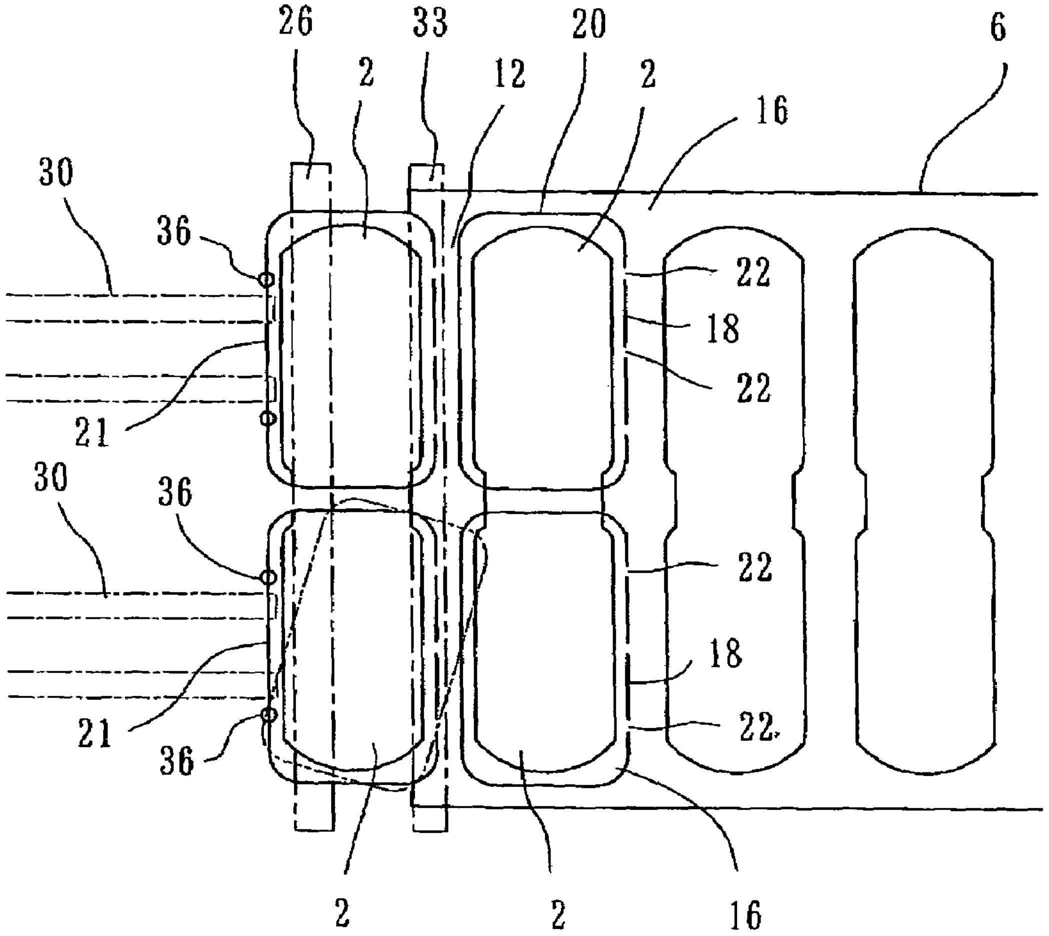
FIG. 2 is a plan view showing the plastic bags and the waste of FIG. 1.

The apparatus further includes web cutting means 8*a* and 8*b* disposed along the feeding path. The web cutting means 8*a* and 8*b* comprises THOMSON blade means opposed to the web material 6. The apparatus further includes drive means 10 by which the THOMSON blade means 8*a* and 8*b* is moved toward and pressed against the web material 6 whenever the web material 6 is intermittently fed and temporarily stopped. The THOMSON blade means 8*a* and 8*b* has a shape corresponding completely to the shape of circumference of plastic bag 2. Accordingly, the web material 6 can be cut into the shape of circumference of plastic bag 2 by the THOMSON blade means 8*a* and 8*b* whenever the web material 6 is intermittently fed and temporarily stopped, to successively make the plastic bags 2 with a waste 12 kept continuous. In the embodiment, the THOMSON blade means 8*a* and 8*b* comprises a pair of THOMSON blades to successively make plastic bags two by two, as shown in FIG. 2. The waste 12 is kept continuous around each of the plastic bags 2.

The apparatus further includes heat seal means 14 disposed upstream of the THOMSON blades 8*a* and 8*b*. The heat seal means 14 comprises heat seal bars which are moved toward and pressed against the web material 6 by the drive means 10 to be synchronized with the THOMSON blades 8*a* and 8*b*. The web material 6 is therefore heat sealed longitudinally and widthwise thereof by the heat seal bars 14 whenever the web material 6 is intermittently fed and temporarily stopped so that heat sealed portions 16 can be formed longitudinally and widthwise of the web material 6. The web material 6 is then cut along the heat sealed portions 16 by the THOMSON blades 8*a* and 8*b*, to successively make the plastic bags 2.

In addition, the THOMSON blades 8*a* and 8*b* comprise partially and totally cutting means. The plastic bag 2 has an upstream edge 18 along which the web material 6 is cut partially by the partially cutting means 8*a*. The plastic bag 2 has other edges 20 and 21 along which the web material 6 is cut totally by the totally cutting means 8*b* so that the plastic bag 2 can be kept connected with the waste 12 at the upstream edge 18 of plastic bag 2 and disconnected from the waste 12 at other edges 20 and 21. In the embodiment, the partially cutting means 8*a* has micro depression formed and spaced from each other along the cutting edge thereof to leave micro joints 22 formed and spaced from each other along the upstream edge 18 of plastic bag 2. The micro joints 22 make the web material 6 cut partially. The plastic bag 2 is kept connected with the waste 12 by the micro joints 22. It should be recognized that the micro joints 22 are shown in exaggeration for convenience. In reality, each of the micro joints 22 has a very small size of about 0.2 mm.

The apparatus further includes drawing means 24 disposed downstream of the THOMSON blades 8*a* and 8*b*. The waste 12 is diverged from the plastic bag 2, directed to and drawn by the drawing means 24 after the web material 6 is cut. The drawing means 24 comprises take up means by which the waste 12 is drawn and taken up. For example, the drawing means 24 comprises a take up roller intermittently rotated whenever the web material 6 is intermittently fed so that the waste 12 can be drawn and taken up by the take up roller 24 without slacking. The plastic bag 2 is kept connected with the waste 12 at the upstream edge 18 of plastic bag 2, as described above, and therefore intermittently fed integrally with the waste 12. The waste 12 may be directed to and drawn by drawing means other than the take up roller 24. For example, the drawing means may comprise pinch rollers between which the waste 12 is pinched. The pinch rollers are intermittently rotated whenever the web material 6 is intermittently fed so that the waste 12 can be drawn by the pinch rollers without slacking.

The apparatus further includes discharge means 26, 28, 30 and 32 disposed downstream of the THOMSON blades 8*a* and 8*b*. The discharge means 26, 28, 30 and 32 comprises upper and lower rollers and upper and lower belts. The plastic bag 2 is directed to the upper and lower rollers 26 and 28 without the waste 12. The plastic bag 2 is then pulled by the upper and lower rollers 26 and 28 to be torn from the waste 12 at the upstream edge 18 of plastic bag 2. The plastic bag 2 is then discharged by the upper and lower belts 30 and 32, as described below.

The apparatus further includes waste guide means 33 which comprises a waste guide roller disposed between the THOMSON blades 8*a* and 8*b* and the upper and lower rollers 26 and 28. The waste 12 is engaged with and guided by the waste guide roller 33 to be changed in direction, diverged from the plastic bag 2 and directed to the take up roller 24 so that the plastic bag 2 can be directed to the upper and lower rollers 26 and 28 and the upper and lower belts 30 and 32 without the waste 12. In the embodiment, the waste 12 is changed in direction to extend upwardly from the waste guide roller 33. The plastic bag 2 is directed along the feeding path of web material 6 which extends horizontally. The waste 12 is therefore diverged from the plastic bag 2 and directed to the take up roller 24 so that the plastic bag 2 can be directed to the upper and lower rollers 26 and 28 and upper and lower belts 30 and 32 without the waste 12.

The plastic bag 2 is directed to and disposed between the upper and lower rollers 26 and 28. The upper roller 26 is then moved toward the lower roller 28 by the drive means 10 to be synchronous with the THOMSON blades 8*a* and 8*b* so that the plastic bag 2 can be sandwiched between the upper and lower rollers 26 and 28 whenever the web material 6 is intermittently fed and temporarily stopped. In addition, the lower roller 28 is driven for rotation by drive means such as a motor when the plastic bag 2 is sandwiched. The upper roller 26 is therefore driven for rotation by lower roller 28. The lower roller 28 is rotated counterclockwise in FIG. 1 while the upper roller 26 is rotated clockwise so that the plastic bag 2 can be pulled by the upper and lower rollers 26 and 28 to be torn from the waste 12 at the upstream edge 18 of plastic bag 2.

The plastic bag 2 then passes through the upper and lower rollers 26 and 28 to be disposed between the upper and lower belts 30 and 32. The upper belt 30 is engaged with a pulley 34 which is moved toward the lower belt 32 by the drive means 10 when or after the plastic bag 2 is disposed between the upper and lower belts 30 and 32. The plastic bag 2 is therefore sandwiched between and discharged by the upper and lower belts 30 and 32.

Accordingly, the apparatus can successively make the plastic bags 2 with the waste 12 kept continuous. The waste 12 can therefore be taken up by the take up roller 24, to conveniently treat the waste 12.

In addition, the plastic bag 2 may be bend or curved considerably to be engaged with the lower roller 28 at the downstream edge 21 of plastic bag 2 when the plastic bag 2 is directed to the upper and lower rollers 26 and 28. The micro joints 22 may therefore be wrenched and torn by a friction between the plastic bag 2 and the lower roller 28 so that the plastic bag 2 can be inclined considerably. The plastic bag 2 may be inclined into a position shown by chained line of FIG. 2 to be overlapped with the next bag 2. In this case, the inclined bag 2 must be damaged by the THOMSON blades 8*b* when the next bag 2 is cut.

Under the circumstances, the apparatus further includes detector means 36 disposed downstream of the waste guide roller 33 for detecting the plastic bag 2 to determine whether the plastic bag 2 is inclined or not when the waste 12 is diverged from the plastic bag 2 and the plastic bag 2 is directed to the upper and lower rollers 26 and 28. In this embodiment, the apparatus is arranged to successively make plastic bags 2 two by two, as described above. In this connection, the detector means comprises a plurality of detectors 36 to allot several detectors 36 to each of the plastic bags 2. The detectors 36 comprise optical sensors which are spaced from each other in a direction perpendicular to the feeding path of web material 6 to be disposed at positions corresponding to the downstream edge 21 of plastic bag 2. The optical sensors 36 can therefore detect the plastic bag 2 to determine whether the plastic bag 2 is inclined or not when the waste 12 is diverged from the plastic bag 2 and the plastic bag 2 is directed to the upper and lower rollers 26 and 28.

The apparatus further includes rejected bag removing means 38 incorporated into the upper and lower belts 30 and 32. The plastic bag 2 is removed by the removing means 38 in response to a detecting signal fed from the optical sensor 36 when the plastic bag 2 is inclined. In the embodiment, a plurality of belts 30 are used as upper belts while a plurality of belts 32 are used as lower belts. In addition, the lower belts 32 are divided into upstream and downstream belts. The removing means 38 comprises a stop disposed between the upper belts 30 at a position between the upstream and downstream belts 32. The stop 38 is moved downward by drive means 40 which is actuated by a control 42 in response to the detecting signal fed from the optical sensor 36 when the plastic bag 2 is inclined. The inclined bag 2 then strike against the stop 38 when being discharged by the upper and lower belts 30 and 32, to be dropped and removed between the upstream and downstream belts 32.

The waste 12 may be cut along cut lines 44 by cutter means after the plastic web 6 is cut by the THOMSON blades 8*a* and 8*b* so that the waste 12 can be divided widthwise of the web material 6 and taken up by the take up roller 24.

Figure 3:
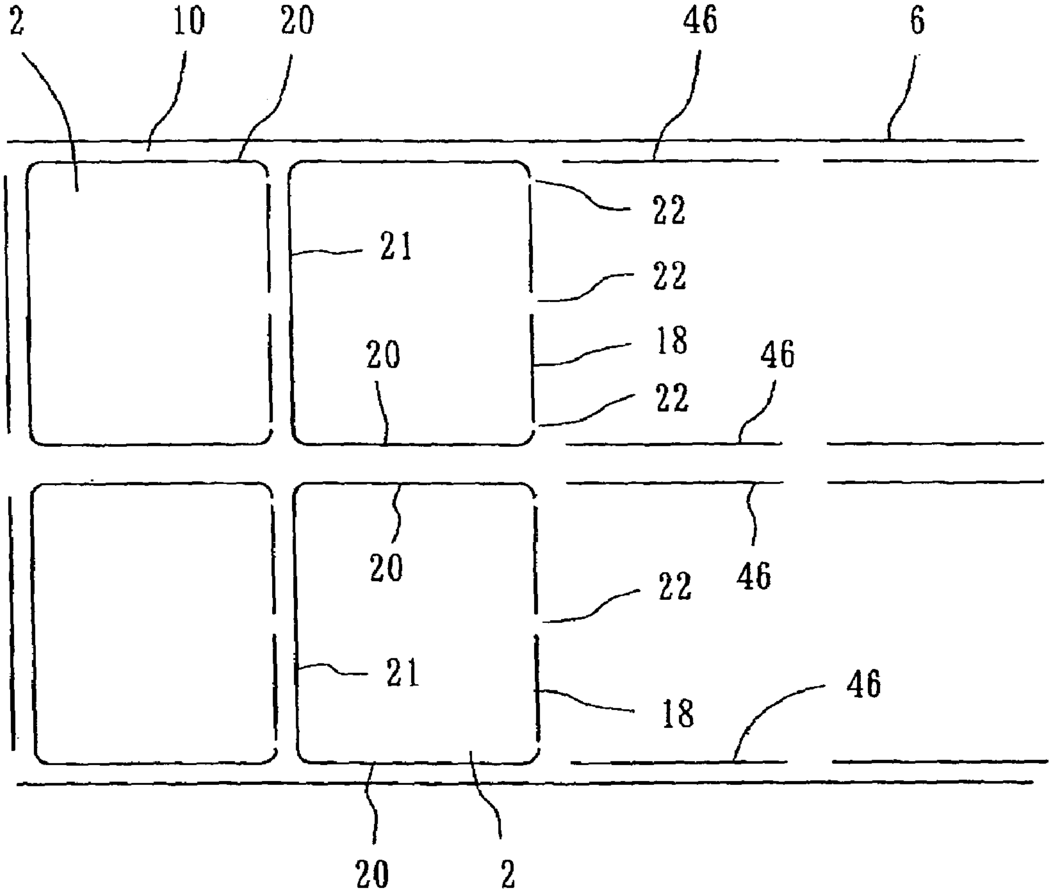
FIG. 3 is a plan view of other embodiment.

The web material 6 may be slit along slit lines 46 by slit blades before being cut by the THOMSON blades, as shown in FIG. 3. In this case, the web material 6 needs merely to be cut along the upstream and downstream edges 18 and 21 of plastic bag 2 by the THOMSON blades whenever the web material 6 is intermittently fed and temporarily stopped. The web material 6 needs not to be cut along other edges 20 by reason that the web material 6 has been slit along the slit lines 46 or other edges 20. The THOMSON blades may therefore have a shape corresponding not completely but incompletely to the shape of circumference of plastic bag 2.

In this connection. It should be recognized that the plastic bag 2 comprises two or more layers of plastic film which are liable to adhere to each other when being cut by the THOMSON blades. On the other hand, the layers of plastic film do not adhere to each other when being slit by the slit blades. The plastic bag 2 may include open top and closed bottom edges comprising other edges 20 along which the web material 6 is slit. It is therefore advantageous in that the open top edge is easy to be open when filling content into the plastic bag after making the plastic bag.

What is claimed is:

1. An apparatus for successively making plastic bags each of which has a shape of circumference, said apparatus comprising:

web feeding means by which a web material is intermittently fed for a length along a longitudinal feeding path, said web material comprising two or more layers of plastic film;

web cutting means disposed along said feeding path, said web cutting means having a shape corresponding completely or incompletely to the shape of circumference of plastic bag so that said web material can be cut into the shape of circumference of plastic bag by said web cutting means whenever said web material is intermittently fed and temporarily stopped, to successively make the plastic bags with a waste kept continuous;

said web cutting means comprising partially cutting means, said plastic bag having an upstream edge along which said web material is cut partially by said partially cutting means so that said plastic bag can be kept connected with said waste at the upstream edge of plastic bag;

said web cutting means further comprising totally cutting means, said plastic bag having other edges along which said web material is cut totally by said totally cutting means so that said plastic bag can be disconnected from said waste at other edges;

drawing means disposed downstream of said cutting means and above said feeding path;

waste guide means disposed downstream of said cutting means, said waste being engaged with and guided by said waste guide means to be diverged from said plastic bag, directed upwardly to and drawn by said drawing means after said web material is cut; and discharge means disposed downstream of said cutting means and waste guide means, said plastic bag being carried by said waste at the upstream edge of plastic bag so that said plastic bag can protrude toward said discharge means from said waste guide means to be directed to and pulled by said discharge means to be torn from said waste at the upstream edge of plastic bag, said plastic bag being then discharged by said discharge means.

2. The apparatus as set forth in claim 1 further comprising heat seal means disposed upstream of said cutting means, said web material being heat sealed longitudinally and widthwise thereof by said heat seal means whenever said web material is intermittently fed and temporarily stopped so that heat sealed portions can be formed longitudinally and widthwise of said web material, said web material being then cut along said heat sealed portions by said web cutting means.

3. The apparatus as set forth in claim 1 wherein said web cutting means comprises Thomson blade means opposed to said web material, said apparatus further comprising drive means by which said Thomson blade means is moved toward and pressed against said web material whenever said web material is intermittently fed and temporarily stopped.

4. The apparatus as set forth in claim 1 wherein said partially cutting means has micro depressions formed and spaced from each other along a cutting edge thereof to leave micro joints formed and spaced from each other along the upstream edge of plastic bag, said micro joints making said web material cut partially, said plastic bag being kept connected with said waste by said micro joints.

5. The apparatus as set forth in claim 1 wherein said drawing means comprises take up means by which said waste is drawn and taken up.

6. The apparatus as set forth in claim 1 further comprising detector means for detecting said plastic bag to determine whether said plastic bag is inclined or not when said waste is diverged from said plastic bag and said plastic bag is directed to said discharge means.

7. The apparatus as set forth in claim 6 further comprising rejected bag removing means incorporated into said discharge means, said plastic bag being removed by said removing means in response to a detecting signal fed from said detector means when said plastic bag is inclined.

* * * * *

UNITED STATES PATENT AND TRADEMARK OFFICE

CERTIFICATE OF CORRECTION

PATENT NO. : 7,044,184 B2
APPLICATION NO. : 10/704600
DATED : May 16, 2006
INVENTOR(S) : Mikio Totani et al.

It is certified that error appears in the above-identified patent and that said Letters Patent is hereby corrected as shown below:

Title Page
Item (30), Foreign Application Priority Data, please change the filing date of the Foreign Application Priority Data to --November 12, 2002--.

Signed and Sealed this

Nineteenth Day of September, 2006

JON W. DUDAS
*Director of the United States Patent and Trademark Office*